(12) United States Patent
Loce et al.

(10) Patent No.: US 7,295,346 B2
(45) Date of Patent: Nov. 13, 2007

(54) METHODS AND APPARATUS FOR ANTIALIASING USING SELECTIVE IMPLEMENTATION OF LOGICAL AND AVERAGING FILTER OPERATIONS

(75) Inventors: Robert P. Loce, Webster, NY (US); Jon S. McElvain, Redondo Beach, CA (US)

(73) Assignee: Xeorx Corporation, Stamford, CT (US)

( * ) Notice: Subject to any disclaimer, the term of this patent is extended or adjusted under 35 U.S.C. 154(b) by 930 days.

(21) Appl. No.: 10/601,686

(22) Filed: Jun. 23, 2003

(65) Prior Publication Data

US 2004/0257620 A1  Dec. 23, 2004

(51) Int. Cl.
*G06K 15/00* (2006.01)

(52) U.S. Cl. ............... 358/2.1; 382/269; 382/256; 382/260; 382/266; 358/1.9

(58) Field of Classification Search ............ 358/2.1, 358/1.9; 382/269, 256, 260, 266
See application file for complete search history.

(56) References Cited

U.S. PATENT DOCUMENTS

| | | | | |
|---|---|---|---|---|
| 5,185,852 A | * | 2/1993 | Mayer | 358/1.9 |
| 5,555,360 A | * | 9/1996 | Kumazaki et al. | 345/443 |
| 5,697,712 A | * | 12/1997 | Sato et al. | 400/120.07 |
| 6,020,979 A | * | 2/2000 | Zeck et al. | 358/1.9 |
| 6,137,918 A | | 10/2000 | Harrington et al. | 382/269 |
| 6,144,461 A | | 11/2000 | Crean et al. | 358/1.9 |
| 6,167,166 A | * | 12/2000 | Loce et al. | 382/266 |
| 6,243,499 B1 | * | 6/2001 | Loce et al. | 382/269 |
| 6,608,942 B1 | * | 8/2003 | Le | 382/279 |
| 6,757,449 B1 | * | 6/2004 | Loce | 382/299 |
| 7,166,067 B2 | * | 1/2007 | Talish et al. | 482/148 |
| 2002/0110274 A1 | * | 8/2002 | Yamamoto | 382/154 |

\* cited by examiner

*Primary Examiner*—Twyler Lamb
*Assistant Examiner*—Jacky X. Zheng
(74) *Attorney, Agent, or Firm*—Fay Sharpe LLP

(57) ABSTRACT

Methods and apparatus for antialiasing images that contain one or more image objects such as colored text, line art, and graphical objects, such that the edge pixels of an antialiased image object will exhibit relatively uniform values, and the appearance of the image object is thereby improved. In one embodiment, an improved antialiasing filter is employed to detect at least one region within the received image. Upon detecting a region containing a background image level that adjoins an image object having pixel values in a range other than a range of limit values, the antialiasing filter sets the pixel values of the edge or border pixels of the image object to substantially the same value. Selection among a logical filter operation and an averaging filter operation may be adaptively employed in the antialiasing filter in order to obtain the desired uniformity of pixel values.

18 Claims, 7 Drawing Sheets

METHODS AND APPARATUS FOR ANTIALIASING USING SELECTIVE IMPLEMENTATION OF LOGICAL AND AVERAGING FILTER OPERATIONS

This invention relates generally to methods and apparatus for antialiasing, and in particular for antialiasing image objects, such as colored text and graphical line art objects, so that the border or edge pixels of such antialiased objects exhibit relatively uniform values.

The aesthetic quality of certain image objects, such as colored text, in a printed document is strongly dependent on the sharpness and continuity of the edges of the image objects when they are reproduced in the document. The desired color or gray level of such image objects is commonly achieved by a printing process known as halftoning, wherein gray level variation is represented by placing a greater or lesser number of saturated pixels in a discrete portion of the image. However, when halftoning is applied in color document reproduction, problems arise in the reproduction of colored text and graphical image structures. Accordingly, halftoning is known to necessitate a compromise between spatial resolution and color resolution. In order to reproduce a given color accurately, a comparatively large halftone cell is typically desired, as large halftone cells allow more gray levels of each color, and therefore, a greater number of colors in the reproduce image. Unfortunately, the use of a large halftone cell causes spatial degradation of the edges of the text and graphical features, and as a result these edges exhibit an unwanted, jagged appearance. Antialiasing is therefore implemented when digitizing text and graphical image structures, whereby intermediate levels of intensity are used to achieve subpixel positioning of edges, in order to reduce or eliminate jagged edges in the reproduction of lines, polygons, and text.

Antialiasing is implemented in conventional practice by first capturing an image at a particular resolution (known as super resolution) that is greater than the final, or desired, output resolution. Next, the captured image resolution is reduced by performing sub-sampling. Such sub-sampling is typically effected via an averaging process. The resulting gray values, produced by averaging the area coverage of back and white at a given pixel location, indicate how much of the pixel should be covered by white and how much by black. Averaging can be well-suited to create pixel values that represent the edge positions of highly saturated (such as fully black or fully white) objects. One such rendering method as described in U.S. Pat. No. 6,167,166, recreates the desired area coverage at print time and repositions the edge by using the gray level created in the averaging operation.

However, we have determined that the conventional use of an averaging process in sub-sampling creates edge pixels having pixel values that vary around the border of certain antialiased image objects. This undesirable variation becomes apparent, for example, when attempting to create outlines for those image objects that comprise pixels having pixel values that lie in a range other than saturated or near-saturated levels, because the outline width is typically made dependent upon the pixel gray level.

Implementation of a high frequency dot screens to render antialiased pixels is problematic. When screens rated approximately equal to 130-150 CPI dots are employed in a rendering module, antialiased pixels are halftoned and printed, resulting in objectionable halftone dots that appear along character edges.

Hyperacuity printing techniques, for example those described by Curry, et al. in U.S. Pat. No. 5,138,339 and U.S. Pat. No. 5,485,289, are known to implement a specialized version of rendering for antialiased line art. However, these techniques require the use of tags to identify the antialiased pixels as antialiased line art. In U.S. Pat. No. 6,243,499 there is mentioned that it is generally desirable to render the borders for gray objects with a high frequency screen, while it may be desired to render the interior of the gray stroke with a lower frequency screen chosen for attributes other than edge rendition. Through an optimized use of thresholds, border pixels are tagged, and subsequently optimally rendered, in a similar manner to border pixels that are gray due to antialiasing. This approach for selective rendering will produce a high frequency edge outline at a gray-to-white border or between two gray levels.

Accordingly, there remains a need for a method and apparatus for creating antialiased image objects such as text and graphical elements that have resulting outlines which exhibit a uniform appearance.

The present invention is directed to improved methods and apparatus for antialiasing, and in particular for antialiasing image objects such as colored text and graphical line art objects such that the edge pixels of such antialiased image objects will exhibit relatively uniform pixel values.

In one embodiment of the present invention, there is provided an antialiasing method wherein an improved antialiasing filter is employed to detect at least one region within the received image. Upon detecting a region containing a background image level that adjoins an image object having pixel values in a range other than a predetermined range of limit values, the antialiasing filter sets the pixel values of the edge or border pixels of the image object to substantially the same value.

In a particular aspect of the present invention, adaptive selection among a logical filter operation and an averaging filter operation is employed in the operation of the antialiasing filter in order to obtain the desired uniformity of pixel values. Such uniform pixel values are then rendered so that uniform outlines are advantageously provided on the edges of certain image objects that would otherwise suffer in appearance, such as printed text and graphical elements.

For a general understanding of the present invention, reference is made to the drawings. In the drawings, like reference numerals have been used throughout to designate identical elements.

Figure 1:
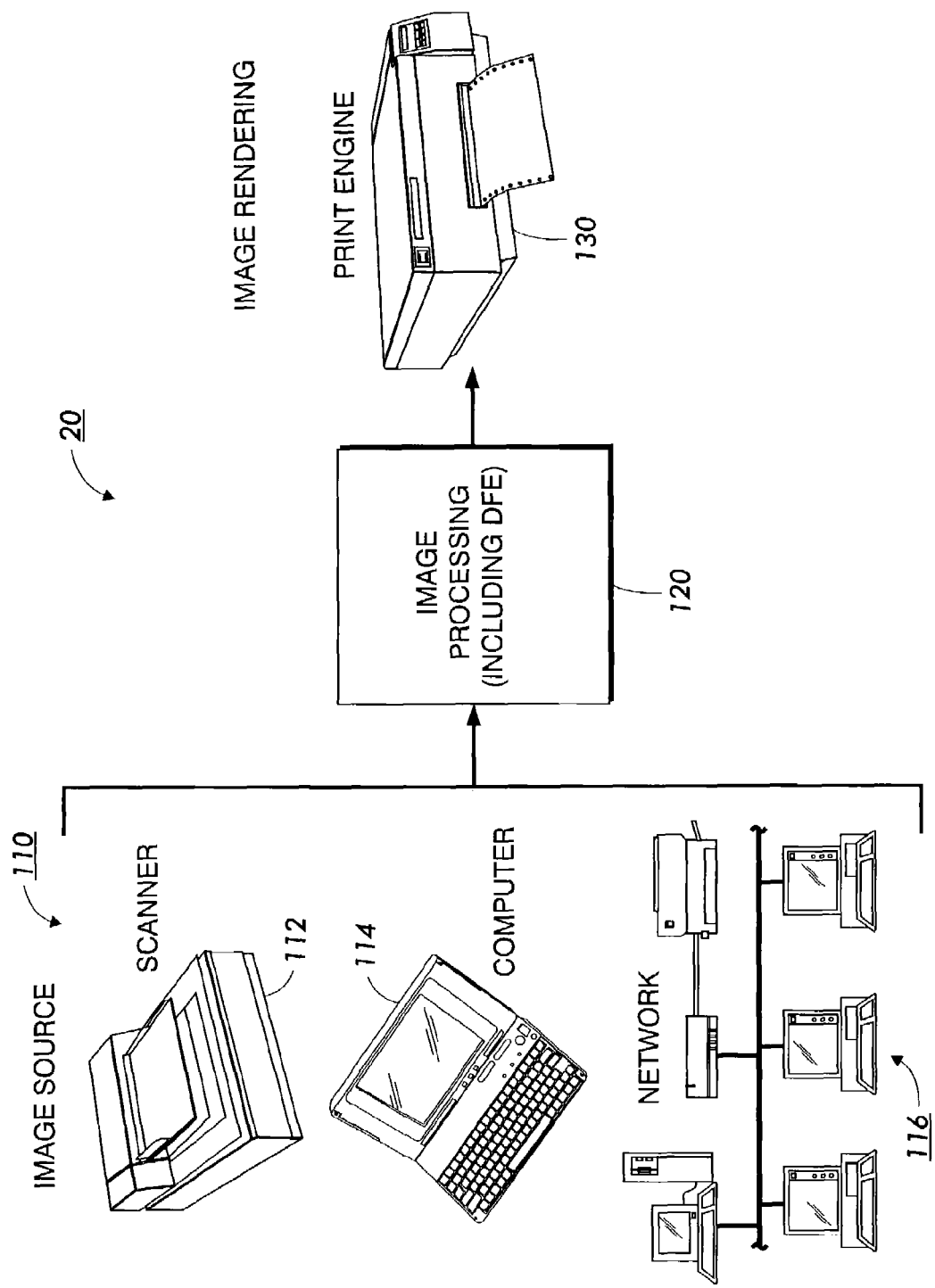
FIG. 1 is a general representation of a suitable system-level embodiment for one or more aspects of the present invention.

The invention is described herein with reference to one or more embodiments. However, it will be understood that there is no intent to limit the invention to the embodiment(s) described. On the contrary, the intent is to cover all alternatives, modifications, and equivalents as may be included within the spirit and scope of the invention as defined by the appended claims.

The term "data" refers herein to physical signals that indicate or include information. An "image", a pattern of physical light, may include "image objects" in the form of characters, words, and text as well as other features such as line art, graphics, or graphical structures. An image may be divided into "segments," each of which is itself an image. A segment of an image may be of any size up to and including the whole image.

The term "antialiased" is intended to refer to those segments or regions of an image that are modified by an antialiasing operation applied to the image (e.g. an image processing operation or a physical process resulting in gray pixels along the edges of image objects).

Each location in an image may be called a "pixel." Each pixel value is a bit in a "binary form" of an image, or a gray scale value in a "gray-scale form" of an image, or a set of color space coordinates in a "color-coordinate form" of an image. The binary form, gray-scale form, and color-coordinate forms are each a two-dimensional array defining an image. Although described herein as being particularly applicable to continuous-tone processing, the present invention applies equally as well to the processing of color images, wherein each separation is treated, effectively, as a gray-scale or continuous-tone image. Accordingly, references herein to the processing of continuous-tone (contone) or gray-scale images is intended to include the processing of color image separations as well. An operation typically performs "image processing" when it operates on an item of data that relates to part of an image.

A "limit" pixel level is described as such in order to indicate one or more pixel levels that lie within a range of saturation or near-saturation gray levels, or within a range of background or near-background levels. The realization of near-saturation and near-background gray levels in such ranges may be dependent upon the particular imaging system that is employed, and accordingly limit pixel levels are within a predetermined range of between 1 to 5 percent (and for some applications, between 1 to 20 percent) of each of the minimum and maximum gray levels of a particular imaging system.

An "image input device" is a device that can receive an image and provide an item of data defining a version of the image. A "scanner" is an image input device that receives an image by a scanning operation, such as by scanning a document.

An "image output device" is a device that can receive an item of data defining an image and provide or render the image as output. A "display" is an image output device that provides the output image in human viewable form.

"Halftoning" refers to rendering the digital image to a bit map form that can be used to drive the imaging device. Early meanings of the term "halftone" as an operation tended to connote production of a binary image, whereas the evolution of imaging technology has expanded the meaning to indicate a process that prepares the pixels for driving the imaging devices. For printing devices, the halftone image that is created is usually in a form such binary pixels, high addressability pixels, pulse width modulation codes, or some reduced quantization form that is compatible with the imaging device in the printer. Halftoning in the present context includes rendering antialiased pixels to high addressable form using specialized rendering cells, as for example, described in U.S. Pat. No. 6,167,166. The halftoning operation may also be directed through the use of tags, as for example, described in these U.S. Pat. Nos.: 6,167,166; 6,243,499; and 6,144,461.

"Resolution" in the present context refers to the number of pixels per inch in a digital image. It is sometimes referred to as dots per inch (dpi), or spots per inch (spi).

"Graphical features," "line art objects," and "text" typically refer to computer-generated features in an image as opposed to pictorial or natural scene content. The terms may also be used to describe computer-generated features that have been printed and re-digitized with a device such as an input scanner.

Turning now to FIG. 1, depicted therein is an embodiment of a preferred digital imaging system 100 that includes an image source 110 for generating image data that is supplied to an image processing system 120, the latter incorporating what is known in the art as a digital front end (DFE). The image processing system 120 produces output image data for rendering by print engine 130. Image source 110 may include scanner 112, computer 114, network 116, or other similar or equivalent image input components. Print engine 130 is preferably a xerographic engine; however, the print engine 130 may include alternative printing or reprographic technologies such as photographic, ionographic, ink jet, etc. The following description of the present invention is directed towards operation of the image processor 120, wherein a novel method for antialiasing includes outlining of selected image objects, such as text and graphical elements. Such outlining reduces jagged edges and thus improves the appearance of the image object. In particular embodiments, the outlines are made uniform in appearance about the perimeter of the image object.

Figure 2:
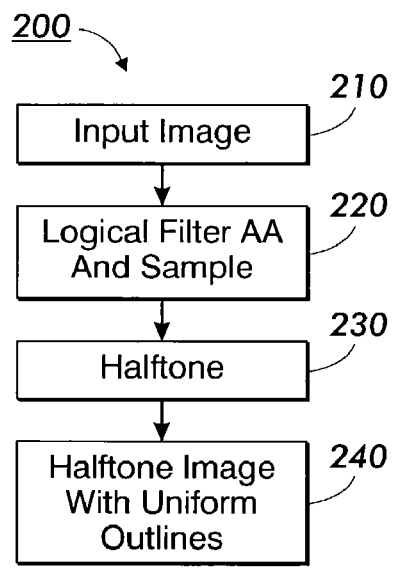
FIG. 2 is a generalized data flow representation of an embodiment of the present invention.

Referring now to FIG. 2, shown therein is a general flow chart 200 of steps operable in an embodiment of the present invention. An input image received in step 210 is input to an antialiasing and sampling step 220 wherein an input image is processed by a novel antialiasing filtering operation which produces an image having one or more image objects that are aesthetically improved by exhibiting uniform border values. The contemplated filtering operation is tailored to the various forms of the input image, such as a Page Description Language (PDL) form or a digital form. If the input image is provided in a PDL form, the uniform boundary values on image objects are created by the antialiasing filter so as to provide an intermediate form of a PDL object that is fitted to establish a border on the image object. Alternatively, the uniform boundary values on image objects may be provided in the form of digital pixel values that are placed into the input image when the image is sampled. A sampling operation is optionally included in step 220, which could be implemented as a digital sampling of a PDL object, sometimes called a Raster Image Processing (RIP) operation, or it can be implemented as a subsampling or resampling of a digital image. In step 230 there is provided halftone rendering of the digital image in order to output, in step 240, a bit map image format that can then be used to drive an imaging device.

The operation of the antialiasing filter includes selective implementation of a logical filter and/or an averaging filter; selection is made according to criteria associated with the image object to be filtered, as will be described in greater detail below. For processing a digital image, the logical filter is contemplated as being implemented in one of several classes or forms, such as a "max filter," wherein the maximum pixel value within an observation window of pixels is used to provide the pixel output value. Another embodiment of a logical filter that is particularly useful for achieving the desired uniform border is one chosen from the class of order-statistic filters, within which the "max filter" is one choice. Order-statistic filters base their output on a ranking of pixel values within the window. For instance, the chosen values could be the value in the range of observed values that is the highest value (using a "max filter"), lowest value (using a "min filter"), or an intermediate value (using a "median filter"). Yet another filter class that is particularly useful for achieving the uniform border is a filter based on counts of pixel values. For instance, in a 4×4 pixel observation window, if 8 or more pixels are determined as possessing the graphical object gray level, then that gray level is chosen as the output value, and less than 8 pixels at that level will produce the background level as the output value. The input image could be one of a plurality of formats, including command-based and pixel-based formats. For instance, the input image may include a computer file of Page Description Language (PDL) commands that describe the image content in a computer language functional form. The form of the input image can be that of a gray-scale digital image, wherein pixel values represent gray levels or color values at the pixel location.

Figure 3:
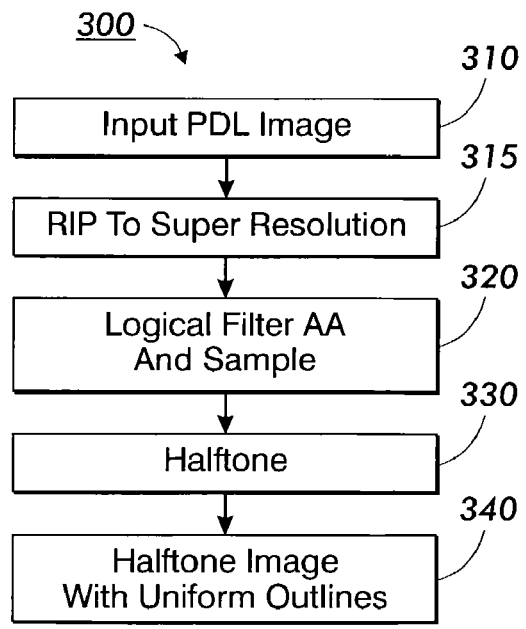
FIG. 3 is a generalized data flow representation of an embodiment of the present invention that utilizes super resolution antialiasing.

FIG. 3 illustrates a general flow chart 300 of steps operable in another embodiment of present invention that utilizes super resolution antialiasing. With respect to super resolution input digital images, the averaging operation typically averages gray values of pixels within a block of super resolution pixels so as to then reduce the block of pixels to a single pixel, but note that a larger window of pixels can be used in the averaging operation. For digital images at the same input and output resolution, averaging is performed using a window of pixels about a target pixel. Averaging within a PDL image representation will average gray values of underlying objects, wherein the local area coverage of an object affects the weighting in the average. In step 310 an input image may be provided in PDL form, that is rasterized in step 315 to a resolution higher than the resolution that will be used in the halftoning step 330. For example, a rasterizer may be employed to digitize the image to 1200 pixels/inch and the pixel resolution before halftoning may be 600 pixels/inch. A logical filtering and optional sampling operation is performed in antialiasing step 320 to reduce groups of high resolution pixels to reduced resolution pixels having a comparably lower resolution. For example, if the super resolution is 1200 spi and the resolution to the halftoner is 600 spi, then counts of pixels values can be performed on 2×2 blocks. When suitable tags are not present, a counting algorithm may be employed to set the output value to an observed gray level, if that observed gray level occurs in half or more of the pixels in the block, and outputs the background value otherwise. In step 330 there is provided halftone rendering of the digital image in order to output, in step 340, a bit map image format that can then be used to drive an imaging device.

Figure 4:
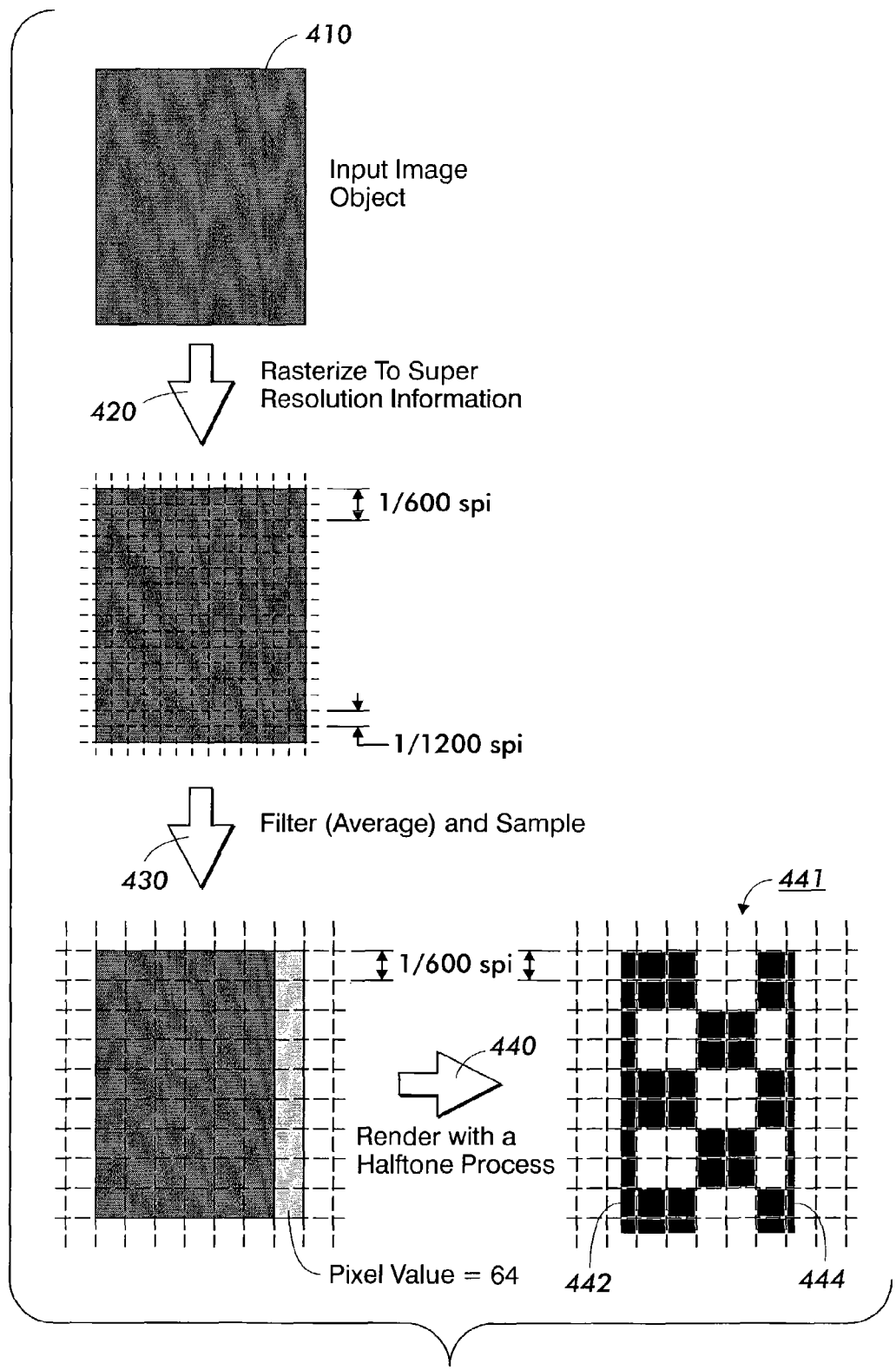
FIG. 4 illustrates antialiasing of an image object wherein the resulting outline width is non-uniform.

FIG. 4 represents the transformation of an input image object according to operation of an embodiment of the present invention. A graphical object 410 possessing a gray level that is a middle tone in the gray range is first rasterized in step 420 to super resolution information. For example, in an eight bit per pixel system, the gray range is 0 to 255, and the midtone is rasterized to pixels having values of 128. A rasterized graphical object at 1200 spi is then filtered in step 430 by averaging 2×2 blocks of pixels and sampling the value of the average to produce an antialiased graphical object at 600 spi. The antialiased graphical object is rendered in step 440 with a halftone process to produce a rendered graphical object 441 having border pixels 442 and 444. The halftone process employs a 600 cell/inch vertical line screen. In the illustrated transformation, the interior of the antialiased graphical object is halftoned with a halftone method that is optimized for optimum gray level representation. In the illustrated instance, a 212 cell/inch dot screen at 45 degree halftone is used for the pixels in the interior of the stroke, and the outermost pixels are halftoned with a halftone method that produces an outline formed of border pixels 442, 444.

Accordingly, one may discern in FIG. 4 that the thickness of the outline differs on at least two sides of the rendered graphical object 441. Such non-uniformity is a result of the averaging processing, which produces border pixels 442 having values on one side that differs from the border pixels 444 on another side of the graphical object. One side has border pixels 442 with value 128, while the other side has border pixels 444 having value 64.

Figure 5:
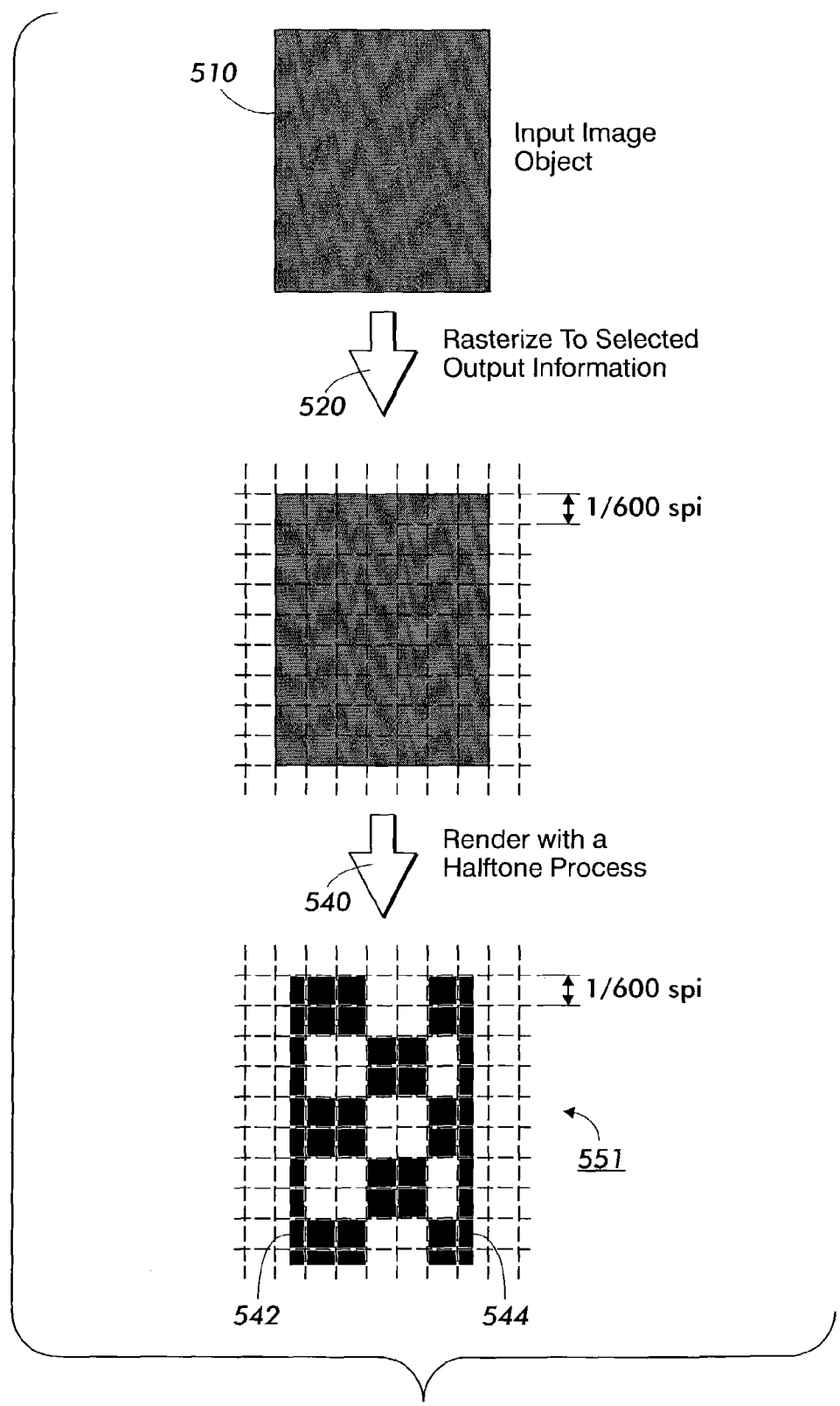
FIG. 5 illustrates antialiasing of an image object according to the present invention whereby the resulting outline width is uniform.

FIG. 5 represents the transformation of a PDL object 510 according to operation of another embodiment of the present invention. The PDL object 410 is rasterized in step 520 to the resolution that is input to the halftoning process, and antialiasing is not performed. The rasterized graphical object 520 has pixels at 600 spi and all pixel values are 128. In the halftoning step 540, the interior of the object is halftoned with a halftone method that is optimized for optimum gray level representation and the boundary pixels are halftoned with a halftone method that produces an outline of the graphical object formed of the desired border pixels. The halftoning process yields a halftoned image object 551. Note that the outline is uniform on the two sides of the object. This uniformity is a result of the edge pixels 552, 554 that exhibit uniform pixel values.

Figure 6:
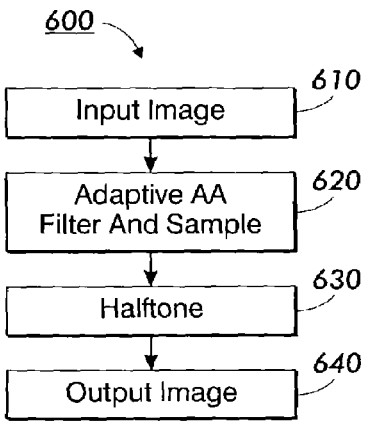
FIG. 6 is a generalized data flow representation of another embodiment of the present invention.

FIG. 6 illustrates a general flow chart 600 of steps operable in an embodiment of present invention that utilizes an antialiasing filter. An input image is received in step 610 and is processed by the antialiasing filter in step 620. In the contemplated antialiasing filter, the application of filtering and resampling is selectively applied according to the local image structure of the input image to be processed. The processing of pixels in an image object having limit pixel values is performed using an antialiasing filter of the averaging type. For image objects having pixel values outside of a predetermined range of limit pixel values, such as pixel values having an intermediate gray level and which are present on a white or gray background, the processing of pixels is performed using an antialiasing filter that creates a uniform gray level at the border of the object.

For example, in the adaptive processing of an unsaturated line art object, the antialiasing filter is operable on a received image to create an improved antialiased image, whereby the antialiasing filter detects at least one region within the received image, and upon observing a region containing a background image level that adjoins an unsaturated line art object, the antialiasing filter sets the gray values of the edges of the unsaturated line art object to be substantially the same value.

In step 630, the antialiased image is halftoned and rendered to a bit map form that can be used to drive an imaging device. The rendered image is output in step 640. The appearance of the rendered image therefore benefits from image objects that are uniformly outlined.

Figure 7:
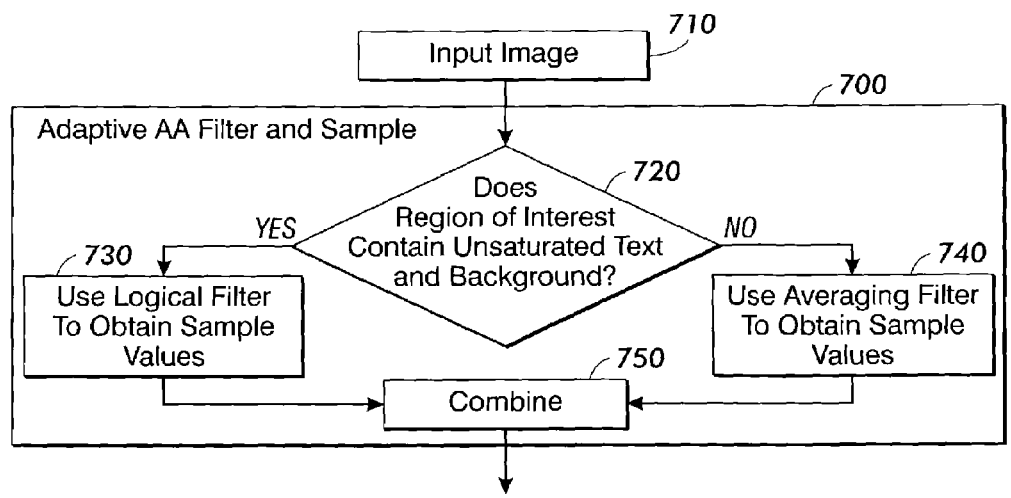
FIG. 7 is a data flow representation of the operation of one embodiment of the antialiasing filter of FIG. 6.

FIG. 7 is a data flow representation of the operation of one embodiment of the antialiasing filter of FIG. 6. An input image, possibly including tags, is received in step 710 by the antialiasing filter 700. If present, the tags may represent various states that describe an image feature or pixel, such as antialiased pixel, colored text object, fine line, pictorial, etc. The antialiasing filter first examines, in step 720, a region of interest about a target location to determine if the region contains a gray (unsaturated) graphical feature adjacent to a white or gray background. The examination operation can be performed by various methods, such as by examining pixel values and tag states in an observation window of pixels and tags in digital image, or by examining objects presented in a Page Description Language format. If, for example, an image object having gray graphical feature is determined to be adjacent to a white or gray background at the target location, a logical filter in step 730 is selectively operated to produce edge values that are uniform around the image object.

In contrast, if the region of interest does not possess a gray graphical feature adjacent to a white or gray background, then the antialiasing filter employs, in step 740, an averaging filter to produce edge values that represent edge position from acquired samples from the input image. The results of the logical and averaging filtering operations are combined in step 750 to form an output image. Note that for either of the averaging or logical filter operations, the final output value may be further modified from the value determined by the specified filter operation to enable better representation in the final image. For example, the output value of a count filter may be increased by 25% to yield slightly darker outlines, or the output of a count filter may receive an added or subtracted value to lighten or darken an outline.

Figure 8:
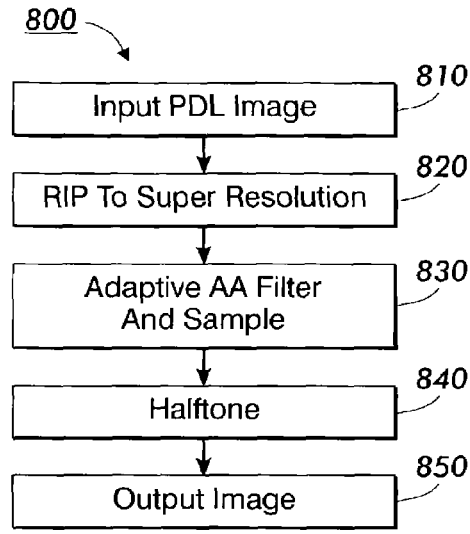
FIG. 8 is a generalized data flow representation of another embodiment of the present invention.

FIG. 8 is a generalized data flow representation of another embodiment of the present invention that employs super resolution antialiasing. A PDL input image containing graphical objects is received in step 810 and in step 820 is rasterized to a super resolution. For example, for an expected resolution at the halftoner of 600 spi, a super resolution of 1200 spi, 1800 spi, or 2400 spi may be effected by a rasterizing image processor (RIP). In super resolution antialiasing, the high resolution is typically an integer multiple of the resolution that will be input to the halftoner. For that resolution condition, an N×M rectangle block of super resolution pixels may be converted to a single pixel for the halftoner. For example, a super resolution of 1200 spi for a halftoner resolution of 600 spi can be thought of as 2×2 pixel blocks, wherein each 2×2 pixel block will be used to form a single pixel to the halftoner. The antialiasing filter is employed in step 830 to process the super resolution image to provide an antialiased image at a resolution that is suitable for input to a halftoner. The halftoning in step 840 produces an output image that benefits from graphical features that are uniformly outlined, and can possess graphical features with edge positions that are optimally represented due to averaging operations selected by the antialiasing filter for antialiasing object possessing limit pixel values. The antialiased-image is output in step 850.

Figure 9:
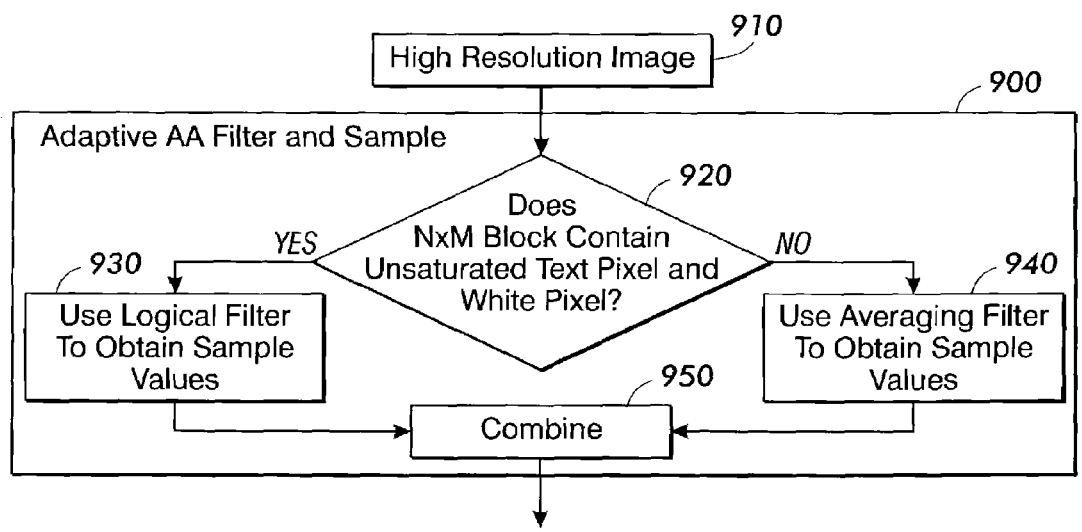
FIG. 9 is a data flow representation of the operation of the antialiasing filter of FIG. 8.

FIG. 9 is a data flow representation of the operation of the antialiasing filter of FIG. 8. A high resolution digital image, possibly incorporating tags, is input in step 910 to the antialiasing filter 900. The digital image in a region of interest at a target location is examined in step 920 to determine whether the region contains pixel having values other than those within a predetermined range of limit pixel values. One method that is well-suited for the super resolution antialiasing is a decision-based algorithm that counts pixel values. If no fully-saturated (i.e., 255) pixel values are detected, then the pixel block is processed in step 930 with a logical filter. The logical filtering can proceed as described above. The determination may also be based upon a tag value that indicates that the pixel block contains unsaturated graphical features, or may be based upon a tag that explicitly indicates that a logical filter should be employed. Alternatively, in step 940, an averaging filter is employed to average pixel values over qualifying pixel blocks and to output an average value. The results of the logical and averaging filtering operations are combined in step 950 to output an antialiased image.

Figure 10:
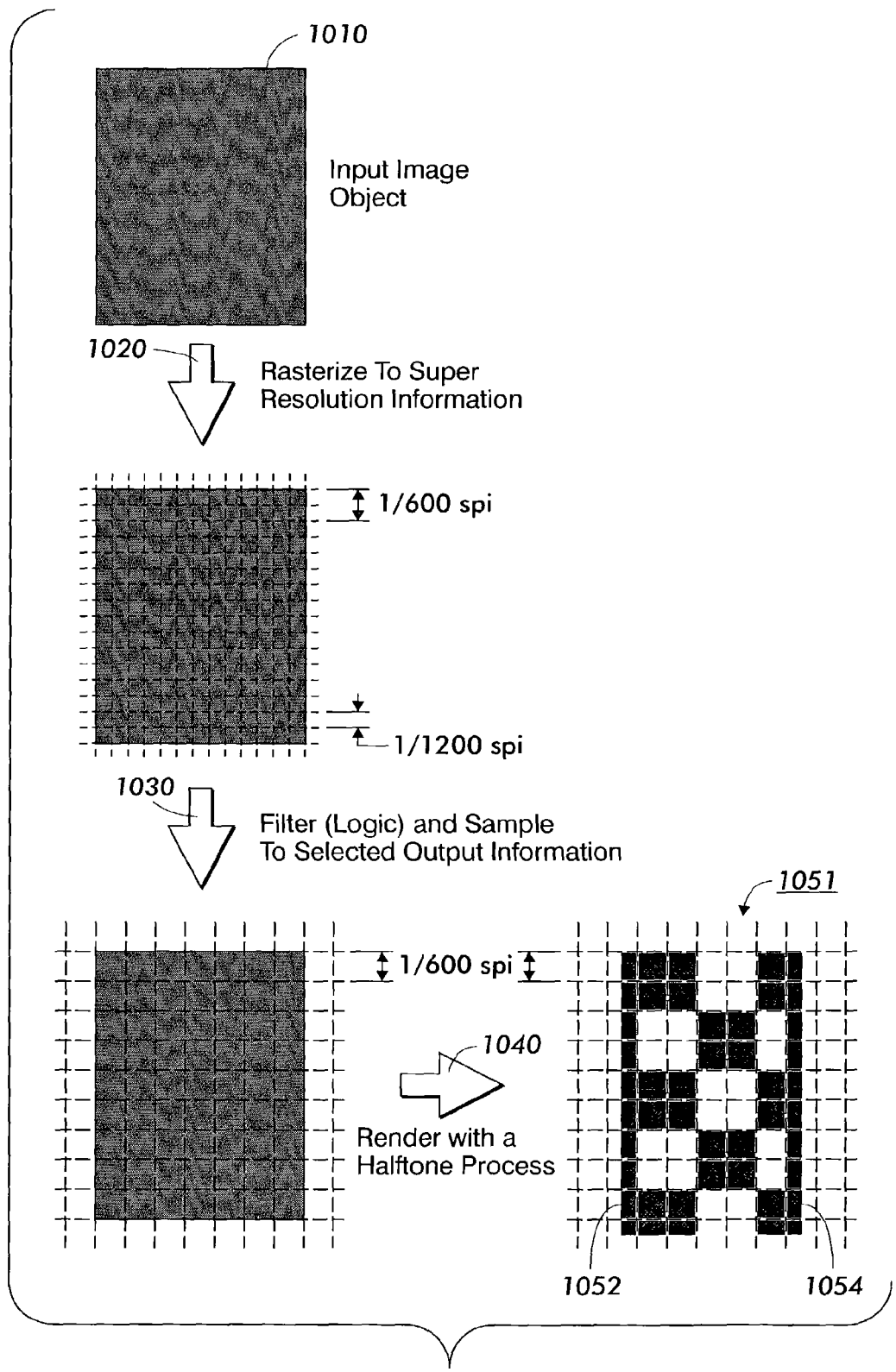
FIG. 10 illustrates antialiasing of an image object according to the process illustrated in FIG. 8.

FIG. 10 illustrates transformation of an image object according to the antialiasing process illustrated in FIG. 8. An image object 1010 that possesses a gray level that is a middle tone of the gray range is received and is rasterized to 1200 spi in step 1020. For example, in an 8 bit/pixel system, the gray range is 0 to 255, and the midtone rasterizes to pixels having values of 128. The image is filtered by the contemplated antialiasing filter and is sampled to produce a 600 spi antialiased image in step 1030. As shown in FIG. 10, the selective filtering operation produces uniform border values on the two sides of the image object. The image is halftoned in step 1040 to produce an antialiased graphical object 1051 that exhibits that desired uniformity of border pixels 1052, 1054. The interior of the graphical object is halftoned with a halftone method that is optimized for optimum gray level representation. In the illustrated process, a 212 cell/inch dot screen at 45 degrees halftone is used for the interior of the image object. The boundary pixels are halftoned with a halftone method that produces an outline of the graphical object formed of the border pixels. In the illustrated process, the chosen halftone method is a 600 cell/inch vertical line screen.

Additional image processing techniques are contemplated as being included within the scope of the present invention. For example, it may be desirable to strengthen or weaken the pixel value present at an inside or outside corner of an image object. Strengthening the value of an outside corner is sometimes referred to as "corner sharpening" and a weakened inside corner is often referred to as an "ink trap." For corner regions, the operation of the contemplated antialiasing filter can be modified to provide image values that are stronger or weaker than the values provided for the remainder of the border. Identification of pixel values present at an inside or outside corner of an image object is taught in Loce et al., U.S. patent application Ser. No. 09/579,089, entitled: "IMAGE PROCESSING METHOD FOR SHARPENING CORNERS OF TEXT AND LINE ART", the content of which is incorporated herein by reference.

Some marking engines will exhibit certain directionally-dependent marking characteristics for one or more of vertical, horizontal, leading edge, or trailing edge image structures. If such a marking engine is employed, the antialiasing filter can also be modified to provide higher or lower image values for a particular edge orientation in order to pre-compensate for the directionally-dependant response of the particular marking process.

Also, the examples of super resolution processing illustrated herein employ averaging and logical filters that can operate to reduce a pixel block to a single value. Alternatively, the filters may use pixel values outside of a pixel reduction block to identify with greater certainty that a target region is associated with a particular type of graphical feature. In still another alternative, a larger window of pixels may be used to generate a more accurate output value.

The content of the following patents are hereby incorporated by reference for their teachings: U.S. Pat. Nos. 6,144,461; 6,020,979; 6,243,499; 6,137,918; and 6,167,166.

While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. In a system for processing document images, a method for antialiasing at least one input image to provide an antialiased image, comprising:
   receiving the input image;
   processing said received input image by operation of an antialiasing filter to create an antialiased image, the antialiasing filter operation including:
   (1) determining one or more regions within the received image,
   (2) detecting that at least one of the one or more determined regions contains pixels having pixel values of a background image level that adjoin pixels of an unsaturated image object having unsaturated pixel values in a range other than a predetermined range of limit values, thereby identifying an edge of the unsaturated image object, and
   (3) setting pixel values of edge pixels of the edge of the unsaturated image object to obtain a desired uniformity of edge pixel values for the unsaturated image object in the at least one detected region; and
   outputting the antialiased image.

2. The method of claim 1, wherein the received image further comprises a digital image and the operation of the antialiasing filter further comprises determining a region of the digital image by extracting an observation window of neighboring pixels at a target location.

3. The method of claim 2, wherein the received digital image further comprises super resolution pixels.

4. The method of claim 3, wherein the antialiasing filter operation further comprises operation of an order-statistic filter applied to the super resolution pixels within the observation window.

5. The method of claim 3, wherein the operation of the antialiasing filter further comprises forming an address based on counting similar values within the observation window, and employing the address for indexing a table of values to determine the pixel values of the edge pixels.

6. The method of claim 2, wherein the pixel resolution of the received image is at or above a value that is an integer multiple of the pixel resolution of the antialiased image.

7. The method of claim 2, wherein the operation of the antialiasing filter further comprises receiving a tag identifying one or more pixels in the input image, the one or more identified pixels being selected for processing by the antialiasing filter, and in response processing the one or more identified pixels.

8. The method of claim 1, wherein the received image is provided in the form of a page description language.

9. The method of claim 8, wherein setting the pixel values of the edge pixels comprises: fitting a page description language object into the image, the inserted page description language object having predetermined pixel values, to establish a border on the unsaturated image object.

10. In a system for processing document images, a method for antialiasing an input image to provide an antialiased image, comprising:
   receiving the input image;
   processing said received input image by operation of an antialiasing filter to create an antialiased image, the antialiasing filter operation including:
   (1) for each target pixel in the image, selecting one of a logical filter operation and an averaging filter operation, wherein the logical filter operation is selected for unsaturated pixels adjoining background portions of the image including pixel values that are within a predetermined range of limit values and the averaging filter operation is selected for all other pixels, and
   (2) applying the selected filter operation for each target pixel in the image, thereby producing the antialiased image, wherein any unsaturated image object in the antialiased image exhibits edge pixels having a desired uniformity of pixel values; and
   outputting the antialiased image.

11. The method of claim 10, wherein the received input image further comprises a digital image and the operation of the antialiasing filter further comprises determining a region of the digital image by extracting an observation window of neighboring pixels at a target location.

12. The method of claim 11, wherein the received digital image further comprises super resolution pixels.

13. The method of claim 12, wherein the selection of logical filter operation and averaging filter operation further comprises the step of examining pixel values within an observation window.

14. The method of claim 13, wherein the operation of the antialiasing filter further comprises application of an order-statistic filter to the super resolution pixels within the observation window, wherein an order-statistic result is used to set the edge values of the image object.

15. The method of claim 13, wherein the operation of the antialiasing filter further comprises forming an address based on counting similar values within the observation window, and using the address for indexing a table of values to set the edge values of the image object.

16. The method of claim 10, wherein the received input image is provided in the form of a page description language.

17. In a system for processing document images, apparatus for antialiasing at least one input image to provide an antialiased image, comprising an image processing unit operable for receiving the input image and for processing said received input image by operation of an antialiasing filter to create an antialiased image, the antialiasing filter being operable to:
   (1) determine one or more regions within the received image;
   (2) detect a region containing a background image level that adjoins an unsaturated image object having unsaturated pixel values in a range other than a predetermined range of limit values;
   (3) set the pixel values of edge pixels of the unsatureated image object to have a desired uniformity of pixel values; and
   (4) output the antialiased image.

18. In a system for processing document images, apparatus for antialiasing at least one input image to provide an antialiased image, comprising an image processing unit operable for receiving the input image and for processing said received input image by operation of an antialiasing filter to create an antialiased image, the antialiasing filter being operable to:

(1) for each target pixel in the image, select one of a logical filter operation and an averaging filter operation, wherein the logical filter operation is selected for unsaturated pixels adjoining background portions of the image including pixel values that are within a predetermined range of limit values and the averaging filter operation is selected for all other pixels;

(2) apply the selected filter operation for each target pixel in the image, thereby producing the antialiased image, whereby any unsaturated image object in the antialiased image exhibits edge pixel values having a desired uniformity of pixel values; and (3) output the antialiased image.

\* \* \* \* \*

UNITED STATES PATENT AND TRADEMARK OFFICE
CERTIFICATE OF CORRECTION

PATENT NO. : 7,295,346 B2  
APPLICATION NO. : 10/601,686  
DATED : November 13, 2007  
INVENTOR(S) : Robert P. Loce Page 1 of 1

It is certified that error appears in the above-identified patent and that said Letters Patent is hereby corrected as shown below:

Title Page, Item (73)

should read

Assignee: Xerox Corporation

Signed and Sealed this

Fourth Day of March, 2008

JON W. DUDAS  
*Director of the United States Patent and Trademark Office*